US005581936A

United States Patent [19]
Belgiorno

[11] Patent Number: 5,581,936
[45] Date of Patent: Dec. 10, 1996

[54] PLANT PROPAGATION TRAYS HAVING INVERTED V-SHAPED AERATED ROOT SEPARATORS

[76] Inventor: Carlo Belgiorno, 1165 Connetquot Ave., Central Islip, N.Y. 11722

[21] Appl. No.: 495,722

[22] Filed: Jun. 27, 1995

[51] Int. Cl.⁶ ........................................... A01G 9/02
[52] U.S. Cl. .......................... 47/66; 47/58; 47/18
[58] Field of Search ................................ 47/66 S, 1.01, 47/1 F, 18, 83, 58

[56] References Cited

U.S. PATENT DOCUMENTS

| | | | |
|---|---|---|---|
| 202,331 | 4/1878 | Conway | 47/66 S |
| 1,983,806 | 12/1934 | Norman | 47/18 R |
| 2,524,546 | 10/1950 | Young | 47/18 R |
| 4,058,930 | 11/1977 | Miles | 47/66 S |
| 4,118,892 | 10/1978 | Nakamura | 47/66 S |
| 5,467,555 | 11/1995 | Ripley | 47/66 S |

FOREIGN PATENT DOCUMENTS 3045390 6/1982 Germany .................. 47/66 S

*Primary Examiner*—Henry E. Raduazo
*Attorney, Agent, or Firm*—Galgano & Burke

[57] ABSTRACT

A plant propagation tray includes a substantially rectangular tray having a perforated bottom formed with a plurality of substantially parallel spaced apart raised inverted V structures or ridges which extend across substantially the entire bottom of the tray from one side of the tray to an opposite parallel side of the tray. According to one embodiment, the tray is provided with side walls for use alone or in a flat. According to another embodiment, the tray is free of side walls and is used in conjunction with a flat, a greenhouse bench, or a container having side walls. The horizontal distance between the ridges is preferably substantially equal to the vertical height of the soil which will be placed on the tray and the vertical height of the ridges is preferably approximately 15–40% of the vertical height of the soil which will be placed on the tray. The trays can be made to accommodate many different sized plants. The trays can be inexpensively manufactured from vacuum-formed thermoplastic. The trays which are provided with side walls can be nested to conserve space during storage and shipping prior to use. Moreover, the trays without side walls may be easily overlapped to fit existing installations such as greenhouse benches.

10 Claims, 4 Drawing Sheets

PLANT PROPAGATION TRAYS HAVING INVERTED V-SHAPED AERATED ROOT SEPARATORS

BACKGROUND OF THE INVENTION

1. Field of the Invention

The invention relates to plant propagation trays. More particularly, the invention relates to a plant propagation tray having inverted v-shaped aerated root separators.

2. State of the Art

Prior to planting, seeds and unrooted cuttings must be propagated to develop a root system which will adequately interface with the soil in which the cutting or seeds will be planted. Typically, these seeds or immature plants are grown in small pots or in trays containing a sterile soil mixture which promotes the growth of a root system. It is important that the root system develop properly so that the plant will interface well with the soil when planted. In particular, it is desirable that the root system spread horizontally so that the roots are in the path of vertically moving water and so that the roots physically stabilize the plant's position in the soil. It is also desirable to provide an oxygen rich environment for the roots during development.

My prior U.S. Pat. Nos. 3,830,015 and 5,040,330 disclose root separators for plant containers which separate and aerate root clumps during development. They afford greater "transplantability" by placing the roots in the vertical movement of water by placing the roots generally laterally outwardly so as to maximize their exposure to the "vertical" supply of water during watering of the developing plant. These root separators, while effective, are designed for use in a single plant container for growing a single plant, and they serve that limited purpose well.

Often it is desirable to propagate a relatively large number of plants and to transport the plants in large quantities prior to planting. The typical manner of accomplishing this goal is to place dozens of small propagation containers in a large tray, sometimes referred to as a flat. The disadvantage of this approach is that each plant or each small group of plants must be propagated in a separate container thereby multiplying the number of containers necessary and increasing the time needed to plant the seedlings in the various containers.

A variety of planters and flower pots are well known for growing plants (see, e.g., U.S. Pat. Nos. 2,834,153, 2,758, 419, 1,996,898, 4,813,177, 4,593,490, 4,296,569, 4,107,876, 4,037,362, 3,830,015, 3,147,569, 3,552,058, 3,381,410), but none disclose as simple and effective plant propagation tray for a multitude of small or young plants as herein proposed.

SUMMARY OF THE INVENTION

It is therefore an object of the invention to provide a plant propagation tray which accommodates a large number of young or developing plants.

It is also an object of the invention to provide a plant propagation tray which has a root separator for separating the root clumps of all of the plants accommodated therein.

It is another object of the invention to provide a plant propagation tray which has a root aerating system for aerating all of the root systems of all of the plants accommodated therein.

It is still another object of the invention to provide a plant propagation tray which is simple in design and inexpensive to manufacture.

It is also an object of the invention to provide a plant propagation tray system which accommodates a large variety of plants.

It is another object of the invention to provide an aerated root separator which is usable in a sided flat having a bottom drainage.

It is still another object of the invention to provide an aerated root separator which is usable in sided greenhouse benches.

In accord with these objects which will be discussed in detail below, the plant propagation tray of the present invention includes a substantially rectangular tray having a bottom which is provided with drainage holes. According to the invention, the bottom of the tray is formed with a plurality of substantially parallel spaced apart raised inverted V structures or ridges which extend across substantially the entire bottom of the tray from one side of the tray to an opposite parallel side of the tray and which are perforated to allow for aeration. According to one embodiment of the invention, the tray is provided with side walls for use alone or in a flat. According to another embodiment, the tray is free of side walls and is used in conjunction with a flat, a greenhouse bench, or a container having side walls. According to a preferred aspect of the invention, the horizontal distance between the ridges is substantially equal to the vertical height of the soil which will be placed on the tray and the vertical height of the ridges is approximately 15–40% of the vertical height of the soil which will be placed on the tray. The trays according to the invention can be made to accommodate many different sized plants. The trays can be inexpensively manufactured from vacuum-formed thermoplastic. The trays which are provided with side walls can be nested to conserve space during storage and shipping prior to use. Moreover, the trays without side walls may be easily set up without cutting to fit existing installations such as greenhouse benches by simply laying them side by side with one V-tray overlapping a portion of the other V-tray in a partially nesting relationship to join them together in the space provided.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
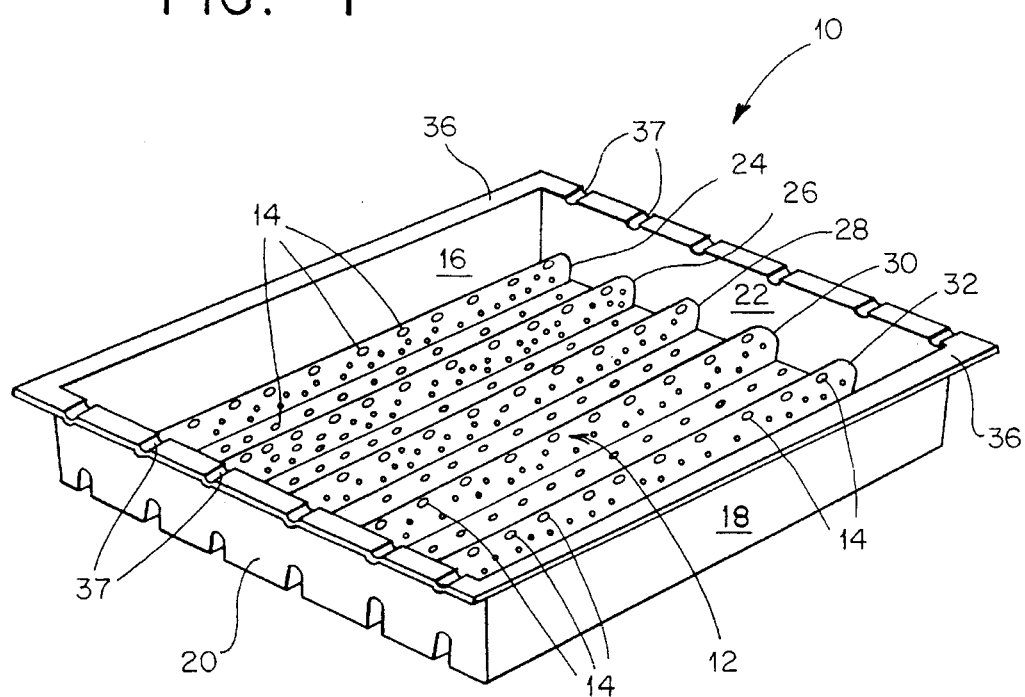
FIG. 1 is a perspective view of a first embodiment of the plant propagation tray according to the invention.
Figure 2:
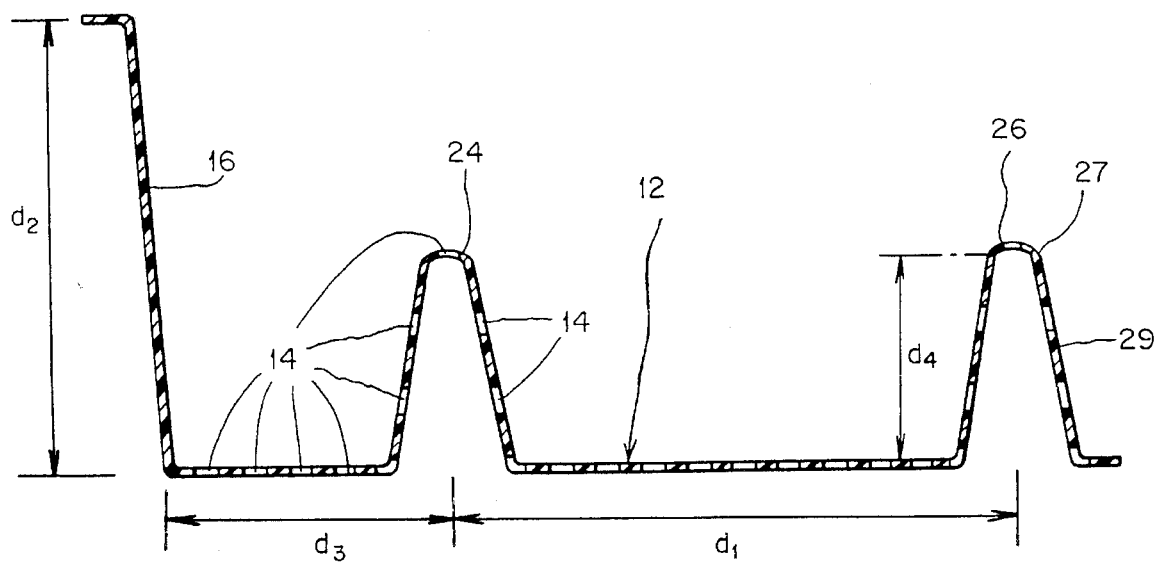
FIG. 2 is an enlarged cross sectional view of a portion of the tray of FIG. 1.

Referring now to FIGS. 1 and 2, a plant propagation tray 10 according to the invention generally includes a substantially rectangular perforated bottom portion 12 having a plurality of drainage/aeration holes 14 and four upstanding side walls 16, 18, 20, 22 which define a container for soil (not shown). Typically, the sidewalls range in height from 1 ½" to 6". According to the invention, the bottom portion 12 of the tray is formed with a plurality of inverted V structures or ridges, e.g., 24, 26, 28, 30, 32 which also include the drainage/aeration holes 14. The ridges are arranged substantially parallel to each other and extend substantially completely across the bottom portion 12 of the tray 10 from one side wall 20 to an opposite side wall 22. The top portion 27 of the ridges are preferably rounded and the sidewalls 29 are preferably angled to facilitate root separation as described in greater detail hereinafter.

According to a preferred embodiment of the invention, the distance $d_1$ between adjacent ridges is substantially equal to the height $d_2$ of the side walls, which is substantially equal to the height of the propagation mix (e.g., sterite, perlite and peat) (not shown) which will be placed on the tray 10. The distance $d_3$ between the side wall 16 and the ridge 24 is substantially one half the distance $d_1$. The distance between the last ridge 32 and the opposite side wall 18 is preferably also equal to $d_3$. The distance $d_4$, which is the height of the ridges, is preferably equal 15–40% of $d_2$; for large cuttings, preferably 15–25%; for large seeds—corn, beans, squash, melons, etc., preferably 15–30%; and for small cuttings and for small seeds, preferably 25–35% of height. The tray 10 are advantageously made from vacuum-formed thermoplastic, are light weight, somewhat flexible, and may be nested one within another. Presently preferred embodiments of the tray 10 are made with the dimension $d_1$ being as small as 1.5 inches or as large as 6 inches, the size of the dimension being related to the type of plants with which the tray will be used.

Figure 3:
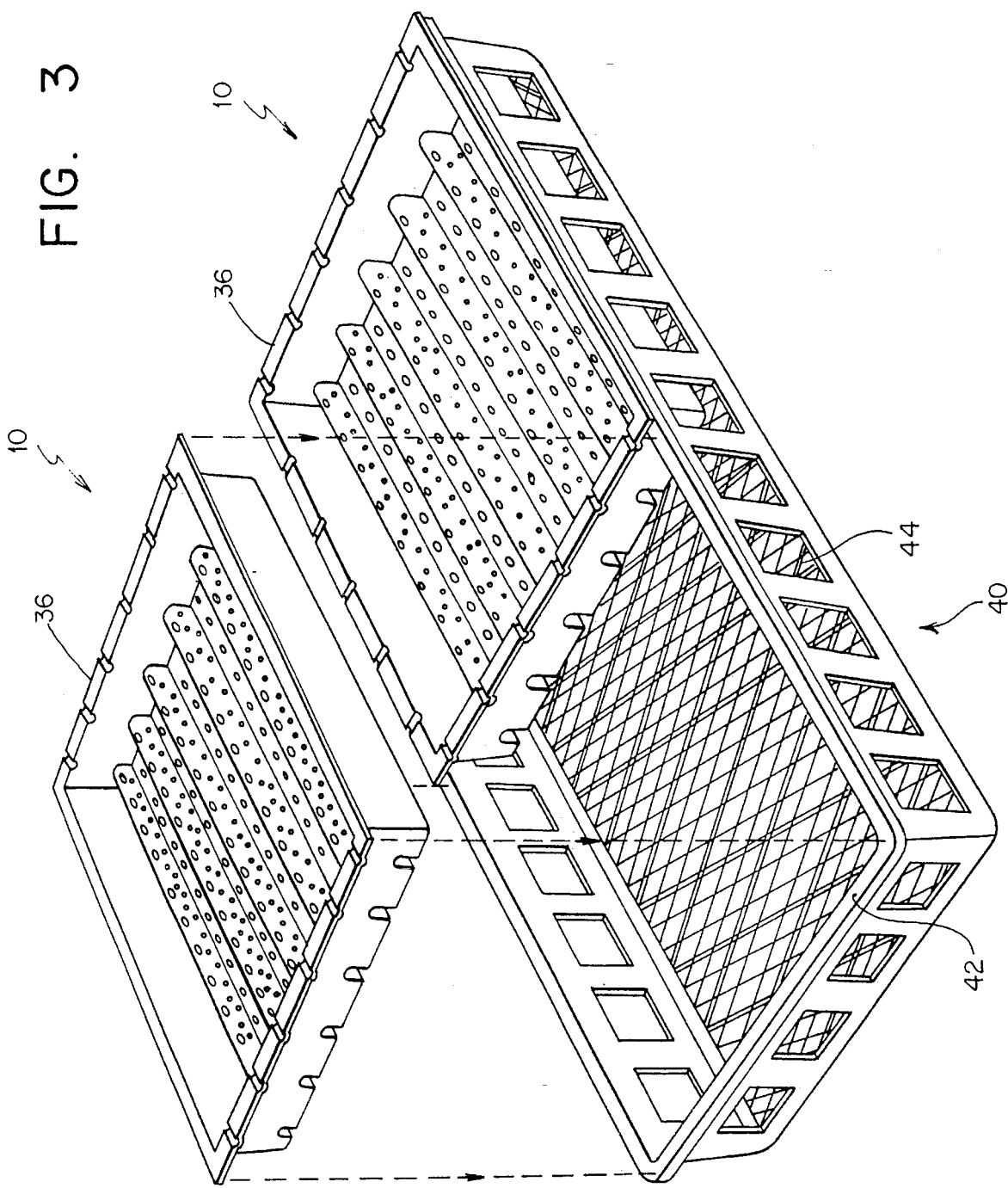
FIG. 3 is a perspective view of two trays according to FIG. 1 fitting into a flat.

The tray 10 of FIGS. 1 and 2 is also preferably provided with an upper lip or flange 36 so that the tray may be lifted easily and an may be supported in and removed from an optimally employed flat. The opposite sides of flange 36 are provided with markings or indentations 37 at spaced apart locations which are in alignment and registry with the rows of V-shaped ridges 24, 26, 28, 30, 32. These markings or indentations 37 assist the grower in locating the ridges (which normally would be covered by the propagation mix) and to allow him or her to plant the seeds or cuttings along each ridge. FIG. 3 shows a typical flat 40 which has an upper lip or flange 42 and a bottom drainage 44 (i.e., a bottom having drainage holes). The trays 10 according to the invention are advantageously dimensioned so that one or more of them fit snugly in a flat 40 with the lip 36 of the tray 10 being supported by the lip 42 of the flat 40.

Figure 4:
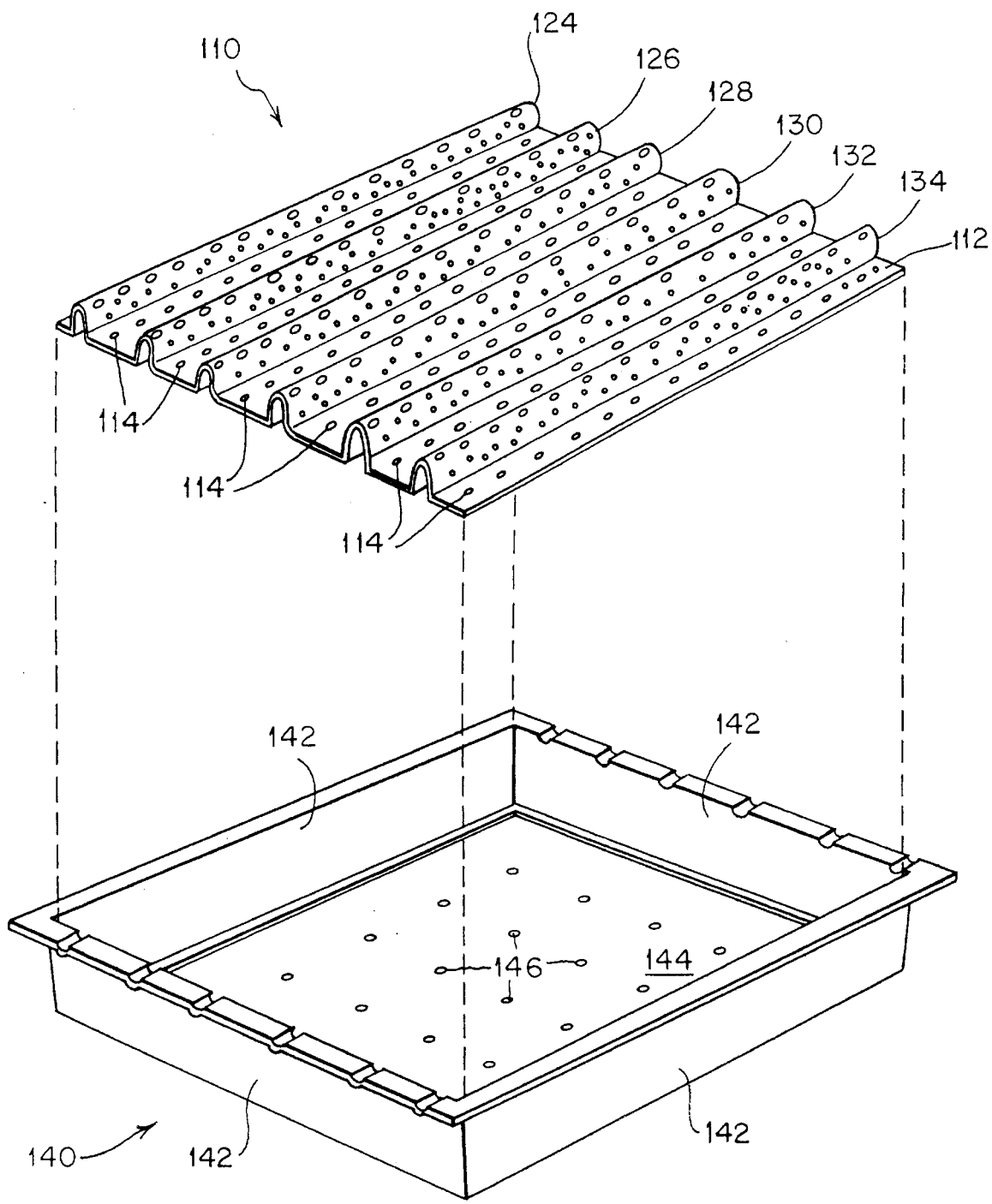
FIG. 4 is a perspective view of a second embodiment of the plant propagation tray according to the invention.

FIG. 4 shows a second embodiment of a plant propagation tray 110 which is similar to the embodiment of FIG. 1 but which is free of side walls. The tray 110 includes a substantially rectangular perforated sheet 112 having a plurality of drainage/aeration holes 114 and a plurality of substantially parallel inverted V shaped ridges 124, 126, 128, 130, 132, and 134. The tray 110 of FIG. 4 is designed for use with a substantially rectangular container 140 which may be a standard flat, a greenhouse bench, or any other suitable structure which provides soil containing side walls 142 and a bottom 144 having drainage holes 146. The dimensions of the tray 110 have substantially the same characteristics as the dimensions of the tray 10 described above. Those skilled in the art will appreciate, however, that the dimensions which referred to the height of the side wall of tray 10 will, in the case of tray 110 refer to the height of the soil (not shown) which will be placed on the tray 110. The tray 110 has several unique advantages. For example, it may be retro-fitted to an existing structure to obtain the advantages of the invention at lower cost, and plural trays may be overlapped without cutting to fit an existing structure. The tray 110 may be made by any suitable plastic forming method and should be provided with enough rigidity to maintain the shape of the ridges after they are formed. If tray 110 is used with a greenhouse bench or other structure having sidewalls, the same is preferably provided with markings or notches on the sidewalls thereof to identify the location of the ridges.

Figure 5:
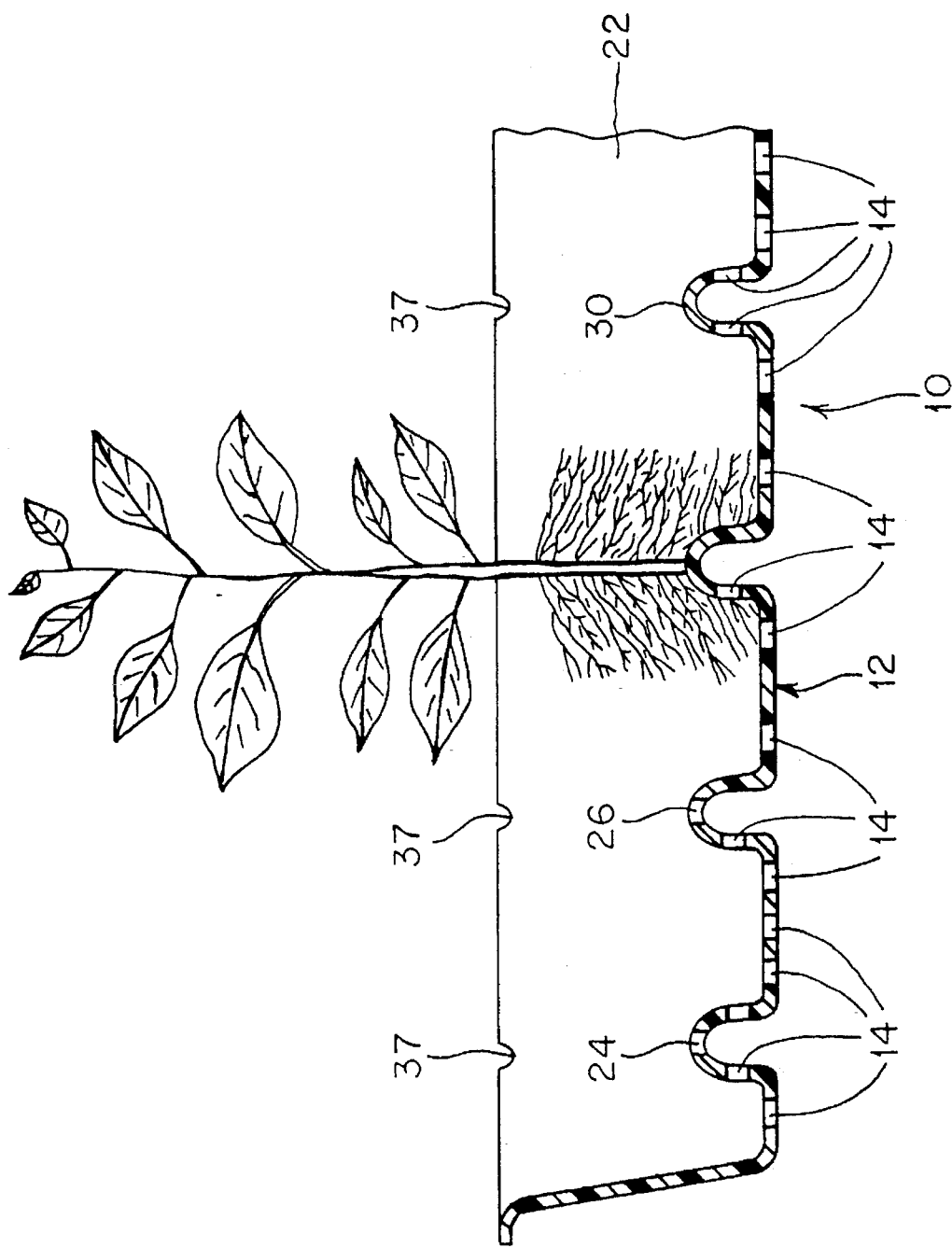
FIG. 5 is an enlarged cross-sectional view of the plant propagation tray illustrating a developing plant propagated thereon.

Both embodiments of the invention achieve the same superior results in the propagation of plants. The aerated ridges provide an oxygen rich environment for the root structure of plants while also dividing the root structure into two portions (see FIG. 5) which may be spread over a mound of soil when the propagated plants are removed from the tray for planting.

Those skilled in the art will appreciate that in order to use the tray according to the invention to propagate cuttings or seedlings, it should first be filled with an appropriate propagation mix such as peat and perlite, peat and sand, perlite and sand, etc. Alternatively, seeds may be germinated and propagated in the tray by first filling the tray with an appropriate germination mix such as fine peat and fine perlite, fine peat and fine vermiculite, etc., so long as the mix is sterile. Large seeds, seedlings, or rooted large cuttings should be placed along the ridges and spaced apart approximately the same distance as $d_1$. This will result in each plant occupying a cubic volume of soil which is easily identified and separated from the other plants when removing the plants from the tray.

It will also be appreciated that small immature plants may be propagated in small trays and then transplanted to larger trays as they mature. When transplanting such a plant, each individual plant is separated and its divided root system is then placed upon a ridge of a larger tray previously topped off with soil. The process is repeated with yet a larger tray for further growth, if necessary.

For plants produced from large seeds, e.g., corn, beans, squash, melons, etc., it typically is not necessary to transplant the same to a larger tray. For these large seed type plants, a deep tray is used (e.g., 4" to 5"), and after four to five weeks, they are ready for planting outside. To remove these plants from the tray, a square is cut around the plant with a knife having a dull, rounded end and a sharp cutting edge, and the cubic volume of soil containing the plant's root system is lifted out of the tray, and the same is then ready for planting.

When the plant is planted in the ground, a wide V-shaped mound of soil is formed in the hole or furrow in which the plant will be planted. The divided root system of the plant is spread over the mound and the extended root mass is covered with soil for a quick positive take.

From the foregoing it will be appreciated that the plant propagation tray according to the invention provides the ability to extend propagation of seeds and/or development of the seedlings prior to planting and provides a propagated plant having a superior root system which results in a healthier transplant. The simple design of the propagation tray allows many plants to be propagated simultaneously in the same tray inexpensively.

There have been described and illustrated herein several embodiments of a plant propagation tray. While particular embodiments of the invention have been described, it is not intended that the invention be limited thereto, as it is intended that the invention be as broad in scope as the art will allow and that the specification be read likewise. Thus, while particular dimensions have been disclosed, it will be appreciated that other dimensions could be utilized. Also, while rectangular trays have been shown, it will be recognized that non-rectangular trays could be used with similar results obtained. Moreover, while the trays have been disclosed as being made from vacuum-formed thermoplastic, it will be appreciated that other materials and methods of manufacture could be used as well. It will therefore be appreciated by those skilled in the art that yet other modifications could be made to the provided invention without deviating from its spirit and scope as so claimed.

What is claimed is:

1. A plant propagation tray for propagating a plurality of plants on the same tray prior to removal and replanting of the plants in soil, said tray comprising:

a substantially rectangular perforated bottom portion, said bottom portion defining a plurality of perforated inverted V shaped ridges, said ridges being substantially parallel to each other and extending across substantially all of said bottom portion from one end of said tray to an opposite end of said tray;

four upstanding side walls defining with said bottom portion a soil container; and means for indicating the position of at least one of said inverted V shaped ridges so that the plurality of plants can be placed on top and in alignment with said inverted V shaped ridges, said indicating means being disposed on at least one of said sidewalls.

2. A tray according to claim 1, further comprising:

an upper lip extending from said side walls.

3. A tray according to claim 1, wherein:

the distance between adjacent ridges is substantially equal to the height of the soil placed in the soil container.

4. A tray according to claim 3, wherein:

the height of said ridges is approximately 15–40% of the height of the soil.

5. A tray according to claim 1, wherein:

the distance between adjacent ridges is substantially equal to the height of said upstanding side walls.

6. A tray according to claim 1, wherein:

the height of said ridges is approximately 15–40% of the height of said side walls.

7. The tray according to claim 1, wherein:

said indicating means comprise indentations in said at least one side wall.

8. The tray according to claim 7, wherein:

said indentations are spaced-apart and in alignment with said inverted V shaped ridges.

9. A plant propagation container and tray assembly for propagating a plurality of plants prior to removal and replanting of the plants in soil, said assembly comprising:

a substantially rectangular container having a perforated bottom wall and four upstanding side walls defining with said bottom wall a soil container;

at least one substantially rectangular perforated tray in the form of a sheet receivable within said container and defining a plurality of perforated inverted V shaped ridges, said ridges being substantially parallel to each other and extending across substantially all of said sheet from one end of said tray to an opposite end of said tray; and means for indicating the position of at least one of said inverted V shaped ridges so that the plurality of plants can be placed on top and in alignment with said inverted V shaped ridges, said indicating means being disposed on at least one of said sidewalls.

10. A method for propagating a plurality of plants the method comprising the steps of:

providing a plant propagation tray comprising,
a substantially rectangular perforated bottom portion, said bottom portion defining a plurality of perforated inverted V shaped ridges, said ridges being substantially parallel to each other and extending across substantially all of said bottom portion from one end of said tray to an opposite end of said tray;

providing means for indicating the position of at least one of said inverted V shaped ridges;

filling said tray with a propagation mix;

planting at least one of seeds, seedlings, and plant cuttings in said propagation mix in said tray in alignment with said inverted V shaped ridges; and promoting growth of at least one of said seeds, seedlings and cuttings; and removing said at least one of said seeds, seedling and plant cuttings from said tray.

* * * * *